United States Patent
Thiessen et al.

(10) Patent No.: US 10,188,051 B2
(45) Date of Patent: Jan. 29, 2019

(54) METHOD FOR CONTROLLING IRRIGATION

(71) Applicant: Board of Supervisors of Louisiana State University and Agricultural and Mechanical College Through the LSU Ag Center, Baton Rouge, LA (US)

(72) Inventors: Maureen Estelle Thiessen, Baton Rouge, LA (US); Jeffrey Stewart Beasley, Baton Rouge, LA (US); Edward Wayne Bush, Baton Rouge, LA (US)

( * ) Notice: Subject to any disclaimer, the term of this patent is extended or adjusted under 35 U.S.C. 154(b) by 250 days.

(21) Appl. No.: 15/021,444

(22) PCT Filed: Sep. 11, 2014

(86) PCT No.: PCT/US2014/055110
§ 371 (c)(1),
(2) Date: Mar. 11, 2016

(87) PCT Pub. No.: WO2015/038723
PCT Pub. Date: Mar. 19, 2015

(65) Prior Publication Data
US 2016/0219806 A1    Aug. 4, 2016

Related U.S. Application Data

(60) Provisional application No. 61/877,792, filed on Sep. 13, 2013.

(51) Int. Cl.
*A01G 25/16* (2006.01)
*G05B 15/02* (2006.01)
(Continued)

(52) U.S. Cl.
CPC .......... *A01G 25/165* (2013.01); *A01G 22/00* (2018.02); *A01G 25/023* (2013.01);
(Continued)

(58) Field of Classification Search
CPC .. A01G 25/023; A01G 25/165; A01G 25/167; A01G 27/003; G05B 15/02
(Continued)

(56) References Cited

U.S. PATENT DOCUMENTS 8,408,229 B2* 4/2013 Goldberg ............. A01G 25/167
137/78.3
8,620,480 B2* 12/2013 Alexanian ............. A01G 25/16
700/284
(Continued)

FOREIGN PATENT DOCUMENTS

CN    202836650    *  3/2013
CN    202836650 U    3/2013
(Continued)

*Primary Examiner* — Chun Cao

(57) ABSTRACT

A system and method for efficiently controlling irrigation and leaching of crops (52) using a pulse detector (60) and digital controller (74) of a water source is disclosed. Irrigation was controlled by using a detector (60) for the water exiting a crop (52) designed to generate a pulse when a predetermined volume of water passes through the crop (52). The grower determines the number of pulses that optimizes the grower's object of minimizing wasted irrigation water or optimizing leaching of the crop.

1 Claim, 7 Drawing Sheets

(51) Int. Cl.
*A01G 22/00* (2018.01)
*A01G 27/00* (2006.01)
*A01G 25/02* (2006.01)

(52) U.S. Cl.
CPC ......... *A01G 25/167* (2013.01); *A01G 27/003* (2013.01); *G05B 15/02* (2013.01)

(58) Field of Classification Search
USPC ........................................ 700/284, 283, 285
See application file for complete search history.

(56) References Cited

U.S. PATENT DOCUMENTS

| | | | | |
|---|---|---|---|---|
| 2001/0049563 | A1* | 12/2001 | Addink | A01G 25/16 700/19 |
| 2008/0034859 | A1* | 2/2008 | Runge | A01G 25/167 73/170.21 |
| 2009/0145985 | A1* | 6/2009 | Mayer | A01G 25/167 239/542 |

FOREIGN PATENT DOCUMENTS

| | | |
|---|---|---|
| EP | 0 308 545 A1 | 3/1989 |
| EP | 0 309 059 A1 | 3/1989 |
| GB | 822566 A | 10/1959 |
| JP | 58143218 A | 8/1983 |
| KR | 1020050010680 A | 1/2005 |

\* cited by examiner

METHOD FOR CONTROLLING IRRIGATION

CROSS-REFERENCE

The present application claims the benefit of U.S. Provisional Patent Application, No. 61/877,792, filed on 13 Sep. 2013 which is hereby incorporated by reference herein in its entirety, including but not limited to those portions that specifically appear herein.

BACKGROUND OF THE INVENTION

The present invention relates to a novel system and novel method for controlling and optimizing irrigation and leaching of agricultural plants.

In commercial nurseries and in other commercial venues where agricultural plants are raised, growers seek to control irrigation of their plants. Motivation for practicing efficient water use includes optimizing water use for irrigation and controlling mineral leaching from soils or soilless substrates during irrigation. Agricultural plants, for example, nursery plants, turf grasses, and commercially grown plants, may be stressed by over watering or under watering. For any particular environmental situation, there is an optimal amount of water required. The optimal amount of water depends on a number of factors, including the time of the day at which the irrigation is done, the frequency of irrigation, the specific crop being irrigated, time of the year, climate, soil and substrate physical properties, and container capacity. A number of methods have been utilized for irrigation control, including electronically or mechanically controlling a water source based on flow rates of the water, weight of nursery pots, and monitoring environmental factors such as temperature and rainfall. Typically, a grower seeks to determine the optimum amount of water to apply to an agricultural plant by either placing a sensor in the soil to determine when the soil has received enough, but not too much water, or by measuring the amount of excess water exiting a contained plant.

Freeman, et al (U.S. Pat. No. 7,123,993), teaches remote control of an irrigation system including a weather sensor to detect whether there has been rain, designed so the operator may control the system through the internet.

Moore, et al (US Publication No. US 20060161309), teaches an irrigation control system for controlling irrigation based on weather data that can receive input data from various sensors.

Stadelhofer (U.S. Pat. No. 3,786,598), teaches the use of a method of using a wick placed in the soil of potted nursery plants connected to a water source beneath the potted nursery plants. The plant draws sufficient water via the wick to keep it properly watered.

Irrigation timing can also be determined by monitoring containers gravimetrically and irrigating based on percentage of container capacity. (See Kaprielian and Adding Infra.) Container capacity is defined as the proportion of substrate volume filled with water after saturation followed by drainage, or, in other words, the maximum amount of water a substrate-filled container can hold against gravity (Fonteno, W. C.; "Growing Media: Types and Physical/Chemical Properties"; In: A Grower's Guide to Water, Media, and Nutrition for Greenhouse Crops (David William Reed, Editor), 1996; Page 93-123; Ball Publishing; Batavia, Ill., US). However, it is not clear what the optimum percentage of container capacity is for plant growth and health. Further, a method based on weight of the container must be recalibrated periodically to account for changes in the base mass of a plant as the plant grows.

Addink (U.S. Pat. No. 6,102,061), teaches using an irrigation controller with pre-set instructions for watering, which is an example of a timed irrigation system.

Evapotranspiration (ET) modeling also has been used for determining irrigation timing. This approach allows the actual ET of a crop to be estimated by measuring ET based on environmental parameters and adjusting it with a specific crop coefficient (Beeson, Richard C.; "Modeling Irrigation Requirements for Landscape Ornamentals"; HortTechnology; January-March 2005; Volume 15; No. 1; Page 18-22; American Society for Horticultural Science; Alexandria, Va., US). This approach requires correlating the ET of a specific crop with the ET of a reference crop, and then correlating these ETs to a crop-specific parameter, such as time since transplant. However, because the relationships often vary considerably even within a species, finding reliable crop coefficients for container-grown woody ornamentals has proven difficult and extremely laborious, and thus ET-modeling has been impractical for most nursery operations.

One example of an application using evapotranspiration is shown in Kaprielian (U.S. Pat. No. 7,937,187). Kaprielian teaches a system and method of computer controlled irrigation and fertigation. As part of its teachings, Kaprielian discloses that his method relies on determining water consumption by a plant by measuring the difference in weight of the water added to a container and the weight of the water exiting the container, or the excess water. These measurements are analyzed by a central processor and from that analysis a predetermined amount of water is used. Kaprielian also teaches irrigation control based on certain chemical parameters.

Another method for controlling irrigation comprises monitoring of substrate, for example soil moisture content using tensiometers or electric probes. Thaxton compared growth, effluent volume, and nutrient uptake for trees irrigated using a switching tensiometer control system compared to cyclically timed treatments, wherein a tensiometer sent a signal to open and close irrigation valves when predetermined moisture levels were attained (Thaxton, V. V.; "Irrigation Management in Large Container-Grown Woody Ornamentals"; M.S. Thesis; 2001; Louisiana State University; Baton Rouge, La., US). Similarly, Nemali, et al used dielectric moisture probes embedded in container substrate to monitor substrate moisture content (Nemali, Krishna S., et al; "An Automated System for Controlling Drought Stress and Irrigation in Potted Plants"; Scientia Horticulturae; 2006; Page 292-297; Volume 110; Elsevier B.V.; Amsterdam, Netherlands). Sensor output was used to control irrigation to maintain a specific moisture level. Murray, et al used a time-domain-reflectometry system to provide measurement of substrate moisture content (Murray, J. D., et al; "Time Domain Reflectometry Accurately Monitors and Controls Irrigation Water Applications in Soilless Substrates; ISHS Acta Horticulturae; XXVI International Horticultural Congress: Protected Cultivation 2002: In Search of Structures, Systems and Plant Materials for Sustainable Greenhouse Production; Volume 633; Page 75-82; International Society of Horticulture Science; Korbeek-Lo, Belgium). However, because substrate moisture may not be uniform throughout the container, results may vary and thus are problematic for commercial application.

Irrigation may also be controlled by monitoring an effluent or leachate exiting a container. In such a system, a precipitation gauge or moisture sensor is located beneath a container to detect an effluent, and the signal is used to control irrigation. In one study, a computer-controlled drip irrigation system was based on presence of effluent by suspending containers above a moisture sensor connected to a datalogger (González, Rico A., et al; "A Computer-Controlled Drip Irrigation System for Container Plant Production"; HortTechnology; July-September 1992; Volume 2; No. 3 Page 402-407; American Society for Horticultural Science; Alexandria, Va., US). The datalogger controlled irrigation valves so that upon commencement of leaching, solenoids could immediately be closed. In a system such as this, total effluent was collected and measured to determine application efficiency. Precipitation gauges measured effluent volume during leaching, which may allow for predictive control of specific leach volumes, adding precision to a practice that has historically been rather ambiguous.

However, none of the methods disclosed provides a quick, inexpensive, and reliable system or method for optimizing irrigation.

Leaching

In addition to reducing wasted water, excess water may damage container plants by leaching necessary nutrients. If plants are over watered, excess water flowing through the planting substrate may deplete soil, or soilless substrates, through leaching of necessary nutrients, for example, minerals such as nitrate salts, ammonium salts, and phosphorous-containing compounds. Excess irrigation also may cause, for example, unwanted changes in pH or electrolytic conductivity of leached soil. Thus, failure to control irrigation may cause uncontrolled leaching of soil, which may be detrimental to plant growth.

However, if excess fertilizer is applied to plants, leaching may be desired. For example, to reduce labor costs, growers may apply controlled release fertilizers (CRFs) less often, but in larger quantities. If CRFs break down at rates quicker than plant uptake, detrimental salt concentrations in the container can result. This problem may be exacerbated if, to save water, one uses one of the methods described above. In those cases in which substrate salinity rises to toxic levels, leaching may be used to return the substrate to acceptable conditions.

The amount of water needed to flush excess salts from the substrate depends on a number of factors, including salinity of irrigation water, percolation rate of irrigation water through a substrate, hydraulic conductivity of a substrate, and amount of water exiting a substrate. The salinity of irrigation water affects the ability of substrate solutes to diffuse from high concentrations in the container to low concentrations in the irrigation water. The percolation rate affects how much time the irrigation water spends mixing with the substrate solution, and depends on the application rate as well as the physical properties of the substrate. Longer rates lead to more intimate mixing, and thus more removal of salts from the profile. Substrate conductivity affects how thoroughly the soil profile is wetted, and is affected by substrate physical properties as well as moisture content. Only substrate that is wetted can be leached. Better conductivity will allow more lateral movement of water and more thorough wetting of substrate. Lastly, higher volumes of water passing through the substrate can carry away larger amounts of solutes. Because of the several variables associated with leaching, it appears that the best measure for leaching effectiveness was to base leaching effectiveness on container capacity rather than the volume of irrigation water.

One approach to control leaching has been to determine a Leach Fraction (LF), where Leach Fraction=Volume of Effluent÷Volume Applied Water. While this approach is simple and relatively inexpensive, it may not always be effective in preventing over or under irrigation. Although it is known that total nutrient loads lost are lower with reduced leach fractions, there is no consensus on what the proper leaching fraction for container crops should be. There are a number of variables associated this approach, many of which are difficult to monitor or control. For example, there may be significant time delays between the time that irrigation is turned off and the time that leaching actually stops, substrate composition may differ, antecedent substrate moisture may not be known, different container size may affect LF, and plant rooting may have a significant effect on LF. LF normally is maintained between 0.10 and 0.60, although this simple approach is not reliable in all cases for controlling leaching. LF typically has been restricted to small container crops, and has not been used for commercial larger, canyard-size crops.

Use of LF has been most successful when growers employ gravimetry or evapotranspiration methods to determine actual daily water use and actual daily water loss. However, as described above, existing methods for measuring water use and loss are complex, expensive, and lack certainty. Thus LF methods currently in use do not appear to be adequate for practical use for most growers. A simpler, less expensive and more consistent method is needed in order for growers to implement good leaching practices in the commercial industry.

SUMMARY OF THE INVENTION

The invention disclosed herein is a novel system and method for controlling irrigation and leaching that is simple, reliable and inexpensive. The novel irrigation system comprises a watering device, one or more contained agricultural plants, a detector comprising a counting device that actuates a digital circuit when a fixed number of pulses are detected and a digital circuit and electronic storage device that actuates a water control valve for the watering device. The novel method employs electrical feed-back circuitry that controls the watering device once the detector reaches a preset number of pulses. The system may be preset to turn on the watering device on selected days and/or at selected times of the day. The detector in this novel system counts pulses as fixed amounts of water exit the contained agricultural plants. The system may be set to turn off the watering devise at the first detection of excess water exiting the contained agricultural plants (that is the first pulse from the detector) to minimize excess irrigation, or the system may be set to turn off the irrigation water after a predetermined amount of additional water has exited the contained agricultural plants (that is multiple pulses from the detector) to control leaching. Thus, the grower may determine whether he or she wants to control and minimize irrigation or to control and optimize leaching by simply programming the number of pulses registered in the electronic storage device.

The novel system and the novel method require no direct measure of the volume or weight of water it applied to the containers or exiting the containers, uses no probe to determine moisture content within a plant container, and uses no probe to determine a chemical composition or conductivity of the exiting water.

DETAILED DESCRIPTION OF THE INVENTION

Figure 1:
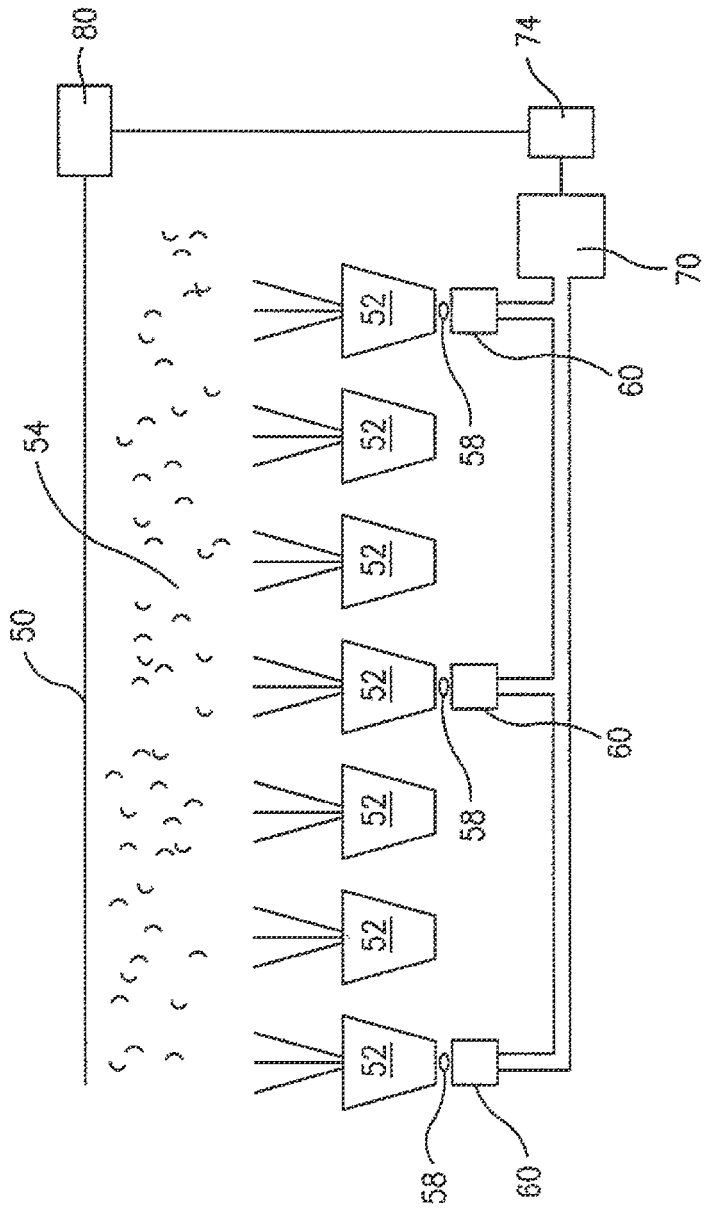
FIG. 1 is a view of the novel system.

The invention disclosed herein is a novel system and method for controlling irrigation and leaching that is simple, reliable and inexpensive as shown in FIG. 1. The novel irrigation system comprises a watering device (50), one or more contained agricultural plants (52), a detector (60) electrically connected to a counting device (70) that actuates a digital circuit (74) when a fixed number of pulses are detected. When a fixed number of pulses are counted a valve (80) that controls water flow is actuated. The novel method employs electrical feed-back circuitry that controls the watering device once the detector counts a predetermined number of pulses. The system may be preset to turn on the watering device on selected days and/or at selected times of the day causing water (54) to fall upon the plants (52). The detector in this novel system counts pulses as fixed amounts of water exit the contained agricultural plants (58). The system may be set to turn off the watering devise at the first detection of excess water exiting the contained agricultural plants (that is the first pulse from the detector) to minimize excess irrigation, or the system may be set to turn off the irrigation water after a predetermined amount of additional water has exited the contained agricultural plants (that is multiple pulses from the detector) to control leaching. Thus, the grower may determine whether he or she wants to control and minimize irrigation or to control and optimize leaching by simply programming the number of pulses registered in the electronic storage device.

Figure 2:
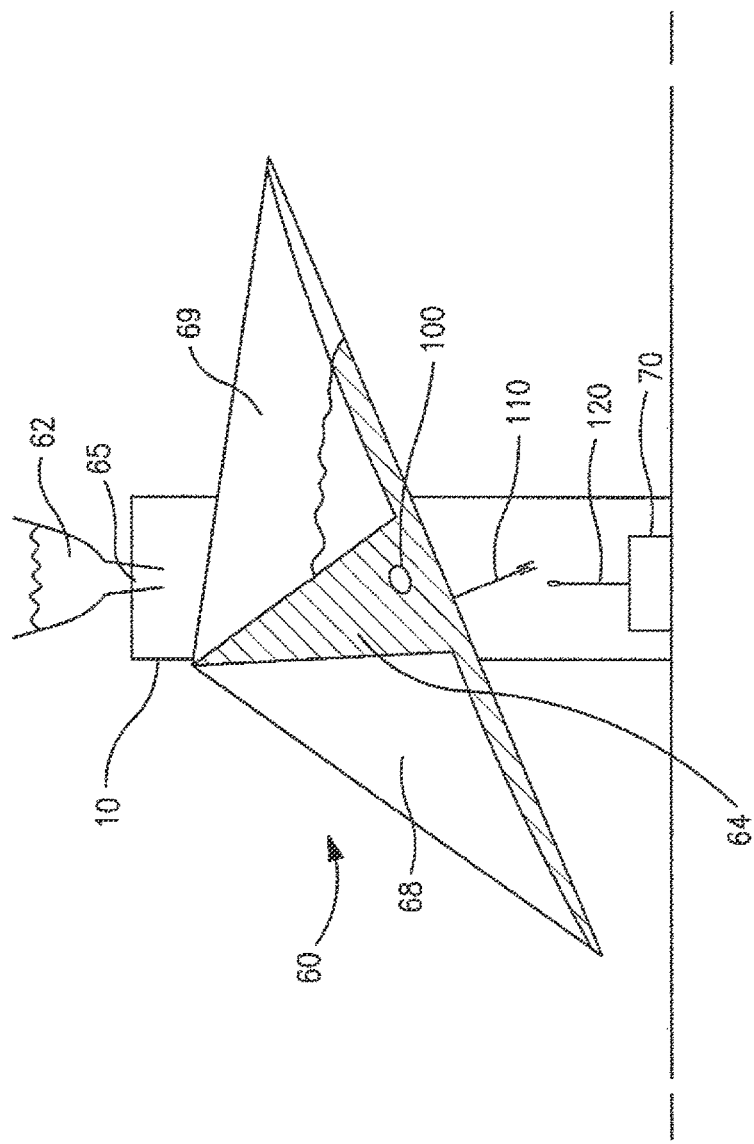
FIG. 2 is a view of the detector.

The detector (60) (see FIG. 2), a tipping bucket sensor, comprises a cylindrical catchment dome (62), a funnel (65) attached to the cylindrical receiving dome, a triangular receiving tray (64), and a pulsing device (70). The cylindrical catchment dome (62) collects water which then channels the water through the funnel in a steady stream into the triangular receiving tray (64) that is located directly below the cylindrical catchment dome (62). The triangular receiving tray (64) is comprised of a first chamber (68) and a second chamber (69) wherein said chambers are of equal volume. The triangular receiving tray (64) is pivotally attached to a fixed backing (10). The steady stream of water flowing into the triangular receiving tray (64) first fills the first chamber (68) causing the triangular receiving tray (64) to tip and then causes the water to be funneled into the second chamber (69) as the first chamber (68) empties. The alternating filling of the chambers causes the triangular receiving tray (64) to rock back and forth on its pivotal attachment (100). A first electrical conducting connector (110) that is magnetized is slidingly attached to the triangular receiving tray (64) wherein it moves with the triangular receiving tray (64) as it pivots. A matching second electrical conducting connector (120) that is attracted to a magnet is fixedly attached beneath the triangular receiving tray (64) to the fixed backing (10) to electrical circuitry (70). The second electrical conducting connector (120) does not move as the triangular receiving tray (64) pivots.

Figure 3:
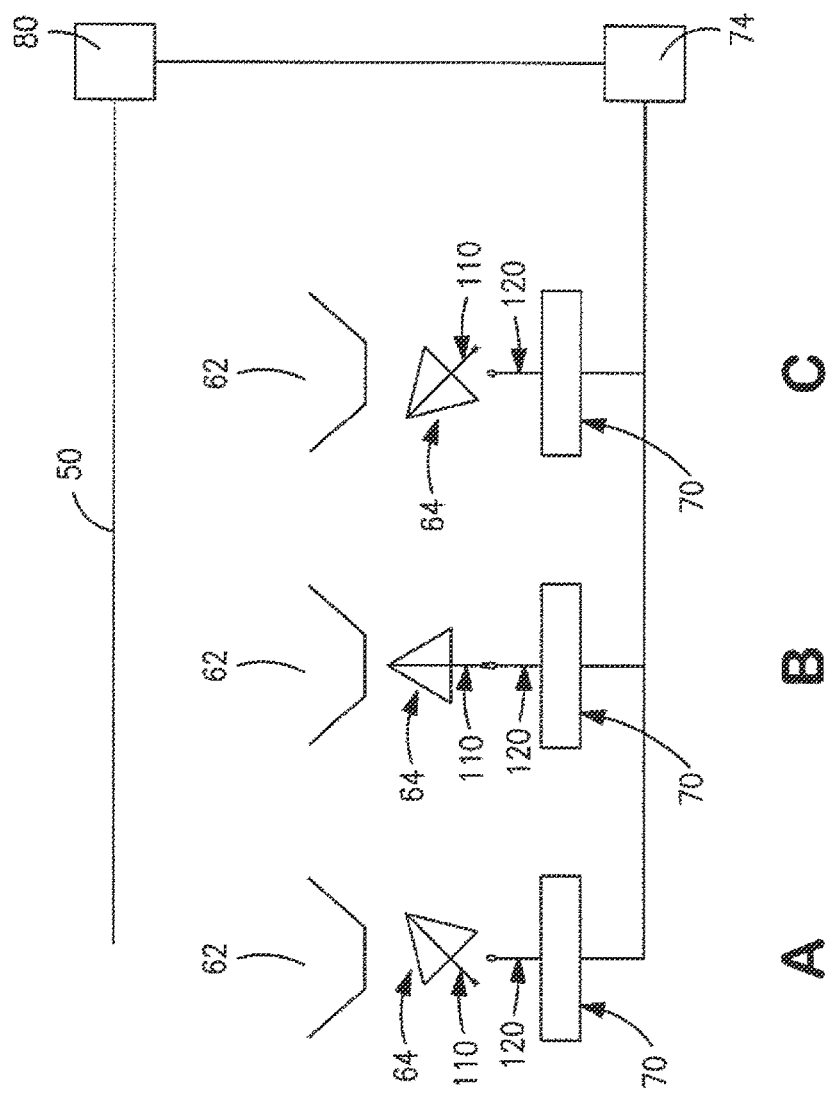
FIG. 3A is a view of the detector in an open circuit position.
FIG. 3B is a view of the detector in a closed circuit position.
FIG. 3C is another view of the detector in an open circuit position.

As shown in FIG. 3A, when the first (110) and second (120) electrical conducting connectors are not close, there is an open electronic circuit, and no current flows between the first and second conducting connectors. As the first electrical conducting connector passes by the second electrical conducting connector, the two conductors become aligned at which time magnetic attraction between the two conductors closes the electrical circuit and generates a pulse, as shown in FIG. 3B. As the first electronic conducting connector continues to move past the second electronic conducting connector, the circuit is broken, as shown in FIG. 3C. Each reversal of the triangular receiving tray causes a pulse. The pulses pass through electrical circuitry (70) to an electronic storage device (74). Once the electronic storage device receives a pre-determined number of pulses, as determined by the grower, a signal is sent to a control valve (80) to turn off the irrigation water (50). The water may then be turned on again either at a set time or after a set interval.

The novel system and the novel method require no direct measure of the volume or weight of water it applied to the containers or exiting the containers, uses no probe to determine moisture content within a plant container, and uses no probe to determine a chemical composition or conductivity of the exiting water.

EXAMPLE 1

This example was a greenhouse study conducted in Baton Rouge, La., done in 2013, wherein six irrigation treatments were compared alongside one another in terms of irrigation and leaching volumes, salts removed, and growth parameters. This study was conducted on one-gallon contained *Petunia* plants. This study compared typical timed nursery irrigation to the novel irrigation system set to shut off irrigation at various quantities of tips. The following table describes the number of tips (or pulses) set to shut off irrigation for several irrigation scenarios during weeks 1 and 4 of this study.

In this example, the details of the various treatments are described below. Treatment 1 was the standard approach, Treatment 2 minimized leaching, and Treatments 3 through 6 demonstrated a use of the system for both daily irrigation to minimize excess leaching and as a once-weekly leaching system to reduce substrate water electrical conductivity.

Treatment 1—Industry Standard in which a timer is set to irrigate for 4 minutes, which was the length of time for irrigation used by a typical nurseryman for his crop.

Treatment 2—In this treatment, this system is used as an irrigation system in which excess leaching is minimized. The grower begins irrigation at a set time each day, and the irrigation is shut off after 1 tip (or pulse) for that day.

Treatment 3—Once a week (for example, on Tuesday), irrigation would start at a set time (for example, at 9:00 AM), and shut off at first tip. The following day (in this example, on Wednesday), irrigation would start at a set time (for example, at 9:00 AM), and shut off after first tip. Containers continued draining after irrigation shut off and were converted to total drained volume. This volume was subtracted from total irrigation applied volume (based on measured time that irrigation was on), and the resulting volume was applied on Thursdays, Fridays, Saturdays, Sundays, and Mondays.

Treatment 4—Once a week (for example, on Tuesday), irrigation would start at a set time (for example, 10:00 AM), and shut off after 17 tips. The following day (in this example, on Wednesday), irrigation would start at a set time (for example, 10:00 AM), and shut off after first tip. Containers continued draining after irrigation shut off and were converted to total drained volume. This volume was subtracted from total irrigation applied volume (based on measured time that irrigation was on), and the resulting volume was applied on Thursdays, Fridays, Saturdays, Sundays, and Mondays.

Treatment 5—Once a week (for example, on Tuesday), irrigation would start at a set time (for example, at 8:00 AM), and shut off after 50 tips. The following day (in this example, on Wednesday), irrigation would start at a set time (for example, at 8:00 AM), and shut off after first tip. Containers continued draining after irrigation shut off and were converted to total drained volume. This volume was subtracted from total irrigation applied volume (based on measured time that irrigation was on), and the resulting volume was applied on Thursdays, Fridays, Saturdays, Sundays, and Mondays.

Treatment 6—Once a week (for example, on Tuesday), irrigation would start at a set time (for example, at 6:00 AM), and shut off after 83 tips. The following day (in this example, on Wednesday), irrigation would start at a set time (for example, at 6:00 AM), and shut off after first tip. Containers continued draining after irrigation shut off and were converted to total drained volume. This volume was subtracted from total irrigation applied volume (based on measured time that irrigation was on), and the resulting volume was applied on Thursdays, Fridays, Saturdays, Sundays, and Mondays.

TABLE 1

Relation Of Tip Number To Irrigation Shut Off

| Treatment | % of Container Capacity Leached In Order To Actuate Irrigation Shut Off | Week 1 Tips Needed To Shut Off Irrigation | Week 4 Tips Needed To Shut Off Irrigation |
| --- | --- | --- | --- |
| 1 | Shut Off After 1 Hour | N/A | N/A |
| 2 | 0 Daily | 1 | 1 |
| 3 | 0% 1x Per Week | 1 | 1 |
| 4 | 10% 1x Per Week | 17 | 19 |
| 5 | 30% 1x Per Week | 50 | 55 |
| 6 | 50% 1x Per Week | 83 | 93 |

Table 1 shows the number of tips of the triangular receiving tray for weeks one and four in this example. As can be seen from Table 1, the number of tips to achieve the desired percent container capacity varied slightly from week 1 to week 4, with the variance increasing as the targeted percent container capacity increased.

Once the system was calibrated, simply using pulses from the detector was used to control leaching. Table 2 shows leaching for differing numbers of tips for each treatment. As can be seen, Treatment 4, wherein 17 tips were initially used, appeared to provide the best growth of the plants. Various effects of increased tip number at irrigation shut off are illustrated by the graphs in FIG. 10.

TABLE 2

Leaching As A Function Of Number Of Tips And Treatment

| Treatment | Cumulative Irrigation Volume (mL) | Cumulative Leach Volume (mL) | Average Growth (Index) | Average Biomass (Grams) | Average Salt Removed (Mg) |
| --- | --- | --- | --- | --- | --- |
| 1 | 18936 | 14523 | 211 | 50 | 1312 |
| 2 | 10155 | 5249 | 286 | 90.75 | 1327 |
| 3 | 5986 | 3038 | 272 | 82.75 | 889 |
| 4 | 7161 | 3166 | 341 | 111.5 | 687 |
| 5 | 10404 | 5522 | 292 | 82 | 629 |
| 6 | 12032 | 7333 | 266 | 93.75 | 640 |

EXAMPLE 2

Example 2 was from a study which irrigated various-sized containers filled with fertilized soilless substrate only. This example demonstrated a use of the novel system as a leaching system where substrate levels of conductivity can be reduced by increasing the number of tips needed to shut off irrigation. As described above, the amount of water needed to flush excess salts from the substrate depends on a number of factors including salinity of irrigation water, percolation rate of irrigation water through a substrate, hydraulic conductivity of a substrate, and amount of water exiting a substrate.

Table 3 shows results obtained for 1 gallon containers, Table 4 shows results obtained for 3 gallon containers, and Table 5 shows results obtained for 7 gallon containers. Containers were irrigated until reaching the number of tips corresponding to the desired percent of container capacity leached. Containers continued draining after irrigation ended and volumes were measured and collected into predetermined volumetric intervals. Electrical conductivity (EC) was measured on these aliquots. When comparing the 1-tip treatment to higher tip treatments, it was clear that one tip was not enough to allow for reduction of EC in all cases. Increasing tip number, however, can reduce EC in the substrate water. Therefore, the novel system disclosed herein also was used effectively for reducing EC when leaching is desired.

TABLE 3

One-Gallon Container

| Percent Of Effluent Drained | EC Of Effluent |
| --- | --- |
| TIPS TO SHUT OFF: 1 | |
| 50 | 2.47 |
| 100 | 2.67 |
| TIPS TO SHUT OFF: 59 | |
| 20 | 1.55 |
| 40 | 1.5 |
| 60 | 1.44 |
| 80 | 1.42 |
| 100 | 1.49 |

TABLE 4

Three-Gallon Container

| Percent Of Effluent Drained | EC Of Effluent |
|---|---|
| TIPS TO SHUT OFF: 1 | |
| 33.3 | 2.9 |
| 66.6 | 3.2 |
| 100 | 3.25 |
| TIPS TO SHUT OFF: 262 | |
| 7 | 4.29 |
| 14 | 4.12 |
| 21 | 3.77 |
| 28 | 3.53 |
| 35 | 3.37 |
| 42 | 3.22 |
| 50 | 3.08 |
| 57 | 2.97 |
| 64 | 2.86 |
| 71 | 2.72 |
| 78 | 2.63 |
| 85 | 2.68 |
| 93 | 2.8 |
| 100 | 2.98 |

TABLE 5

Seven-Gallon Container

| Percent Of Effluent Drained | EC Of Effluent |
|---|---|
| TIPS TO SHUT OFF: 1 | |
| .3 | 4.47 |
| 66.6 | 4.2 |
| 100 | 4.14 |
| TIPS TO SHUT OFF: 492 | |
| 7 | 4.82 |
| 14 | 4.33 |
| 21 | 3.87 |
| 28 | 3.54 |
| 35 | 3.26 |
| 42 | 3.01 |
| 50 | 2.81 |
| 57 | 2.62 |
| 64 | 2.46 |
| 71 | 2.32 |
| 78 | 2.23 |
| 85 | 2.13 |
| 93 | 2.2 |
| 100 | 2.34 |

EXAMPLE 3

This example was from a study at a commercial nursery in 2013, known as the Windmill Study. In this example the novel system disclosed herein was compared with the nursery's typical practice.

Figure 4:
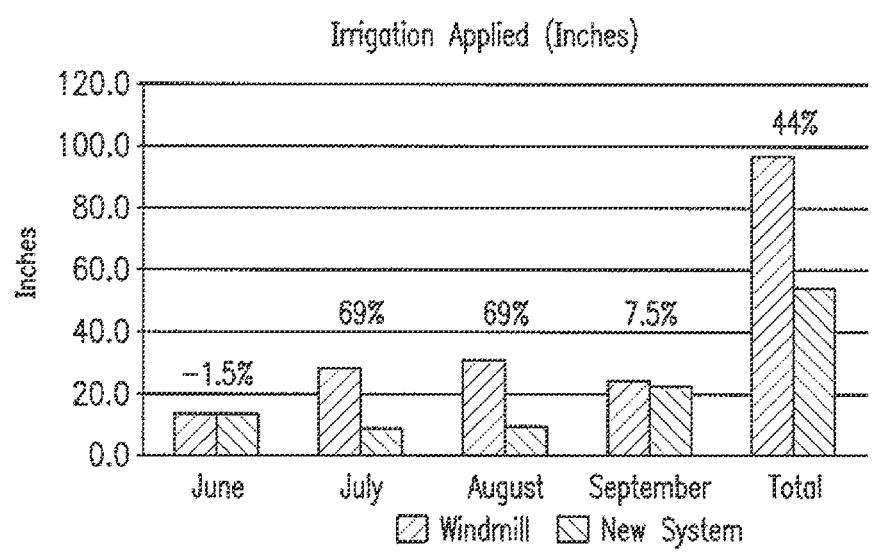
FIG. 4 is a plot of Irrigation Volume.

The novel irrigation system was designed to manage container nursery irrigation with the intent to reduce irrigation consumption and runoff. A trial was conducted at a plant nursery in Franklinton, La., in the summer of 2013 to determine the feasibility of the system on a commercial setting. The novel system was run alongside traditional timed irrigation management regimen on *Gardenia jasminoides* 'Frostproof' and 'August Beauty.' Each treatment plot consisted of approximately 90 three-gallon containers of each *Gardenia* cultivar. Plants were overhead-irrigated for four months, during which pulse detectors were placed beneath 1% to 2% of the containers. The exiting water was funneled into a tipping bucket detector as shown in FIG. 1. In this example, the treatment plot utilizing the novel system used 1 tip to shut off irrigation, and was compared to a control plot wherein irrigation was applied for one hour every morning according to typical nursery practices (see FIG. 4). Irrigation applied and water leached (effluent) were measured daily for each treatment. Enhanced growth and plant quality were achieved with the novel system using less water for irrigation, and there was less water leached from the plants than the typical nursery practices in every almost every month.

Figure 5:
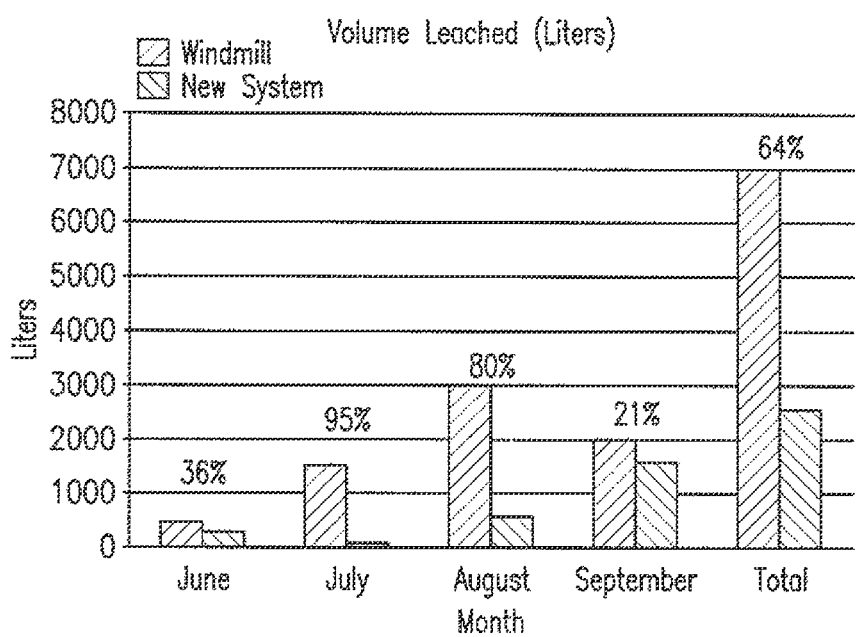
FIG. 5 is plot of Leaching Volume.

FIG. 5 shows a plot of irrigation volume applied and water leached, respectively, as a function of the month for conventional irrigation and the novel system disclosed herein. As can be seen, the system disclosed herein utilizes significantly less water than would be used conventionally. Because of this reduced amount of water used, the grower saved significantly on his nursery costs.

Figure 6:
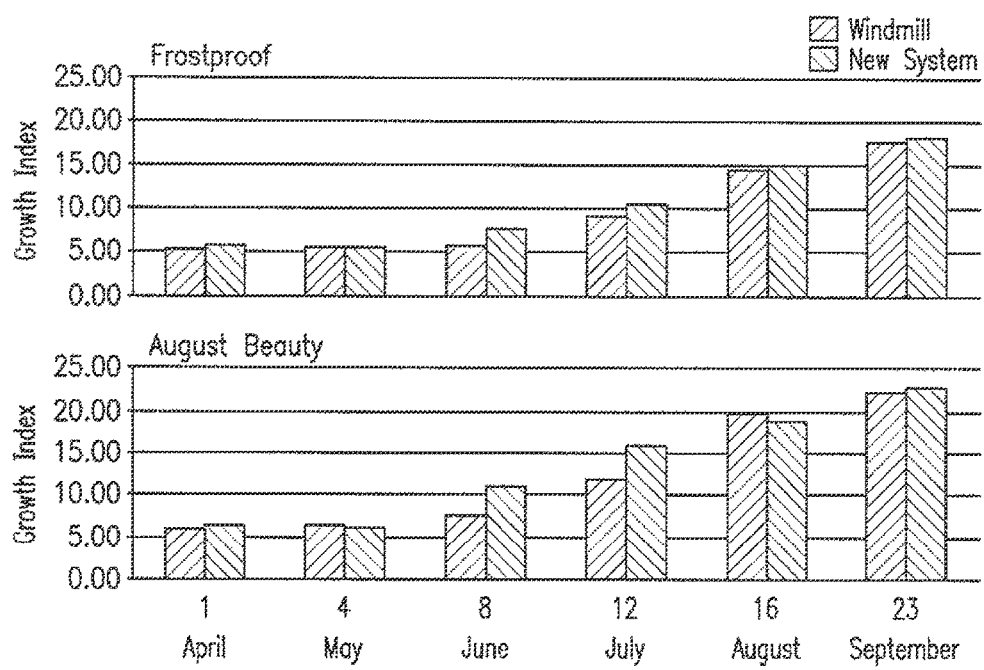
FIG. 6 is plot of Growth Index.

To determine the effectiveness of the novel system, a "growth index" was measured. Growth index for this application was measured by taking plant measurements in three planes (length, width, height) of the plant canopy and dividing by three. In most months, growth index was higher or similar for plants grown using the novel system disclosed here as compared to the grown index for plants grown using typical nursery irrigation management (see FIG. 6).

Biomass also was measured to demonstrate that the novel irrigation system described herein was preferable over the traditional approaches used by commercial nurseries. To determine biomass, the plants were removed from their containers and then all soilless substrate was removed. Then the plant tissue was dried at 65° C. for 72 hours. In addition, shoots were separated from roots for weighing. Biomass was determined after 4 weeks of irrigation, and again after 18 weeks of irrigation. In all cases plant biomass was greater for plants grown using the novel irrigation system described herein when compared with the biomass of those plants grown using typical nursery irrigation management. As shown in Table 6, below, the growth of the *Gardenia* was actually enhanced with the more efficient use of water.

TABLE 6

Comparison Of *Gardenia* Growth Under A Conventional Timed Irrigation System Versus A New System

| | Conventional Timed System | New System |
|---|---|---|
| Growth index | 22.23 | 22.8 |
| Root Mass (Grams) | 61.6 | 78.4 |
| Shoot Mass (Grams) | 114.5 | 136.4 |
| Leaves Per Plant | 118.5 | 164.6 |

EXAMPLE 4

Figure 7:
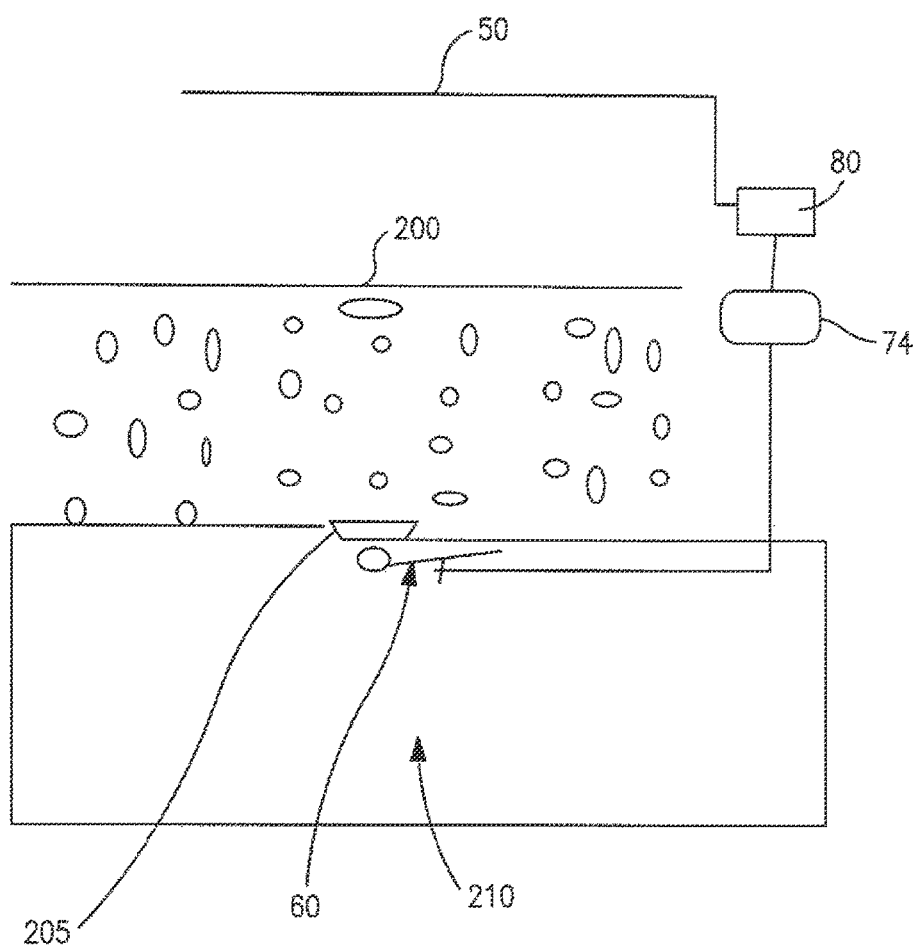
FIG. 7 is a view of a system with the detector in a drain.

The system and method disclosed herein would not be limited to container nursery crops, but could be used in any environment in which excess water from irrigation can be collected. For example, as shown in FIG. 7, one could place a collector (205) and detector (60) in the underground drainage system (210) for golf courses, for athletic fields, or for restoration work on levees and other restoration environmental projects. In this example water from irrigation would fall on grass or other plants (200). The water would percolate through the substrate to reach the detector (60) located in a drain (210) beneath the grass or other plants. The pulse from the detector would be stored in a datalogger (74), which would then control the valve (80) as described elsewhere in this application to control the water source (50). The location and number of collectors and detectors could be optimized with experimentation, but it is expected that collection of excess water from between ⅓ and ⅔ of a golf course, athletic field, or other planting would be adequate. Further, a grower could design any commercial field crops with a fixed number of raised growing areas with soil depth and composition similar to that of soil not raised. The collectors and detectors could be placed under the raised portions for control of both irrigation and leaching.

The invention claimed is:

1. A method for controlling irrigation of one or more agricultural plants comprising
    A. Allowing irrigation water to fall on agricultural plants from a container through an aperture in the container that may be opened or closed electronically;
    B. Collecting irrigation water that exits the agricultural plants into a collector,
    C. Funneling the irrigation water from the collector into a tipping bucket, wherein the tipping bucket has two sides of triangular shape, and a bottom beneath and common to both sides, and wherein an electrode is fixedly attached to the bottom;
    D. Allowing the irrigation water to fill one side of the tipping bucket sufficiently to cause it to tip, causing the electrode fixedly attached to the bottom of the tipping bucket to move past a second electrode electrically connected to an electrical circuit that is also connected to the aperture in the container from which the irrigation water comes;
    E. Completing an electrical circuit for a time sufficient to generate an electrical pulse;
    G. Counting each electrical pulse,
    H. Sending the electrical pulse created when the first fixedly attached electrode instantaneously contacts the second electrode to the aperture of the container from which the irrigation water comes;
    I. Opening or closing the aperture of the container; and
    K. Not using weight measurements, pH measurements, soil moisture measurements, nor measurements of chemical composition of the irrigation water exiting the agricultural plant to control the opening or closing of the container from which the irrigation water comes.

* * * * *